United States Patent
Dalrymple et al.

(10) Patent No.: US 6,648,471 B1
(45) Date of Patent: Nov. 18, 2003

(54) EYEGLASS FRAME

(76) Inventors: David Dalrymple, 2220 Fonger Ave., Rockford, MI (US) 49341; Jack R. Nyenhuis, 1441 Broadview, Jenison, MI (US) 49428; Craig Veleeke, 306 W. 11th St., Holland, MI (US) 49428

(*) Notice: Subject to any disclaimer, the term of this patent is extended or adjusted under 35 U.S.C. 154(b) by 0 days.

(21) Appl. No.: 10/238,481

(22) Filed: Sep. 10, 2002

(51) Int. Cl.⁷ ................................................. G02C 5/14
(52) U.S. Cl. ........................................ 351/111; 351/41
(58) Field of Search .................... 351/111, 113, 351/114, 41, 121, 158; 2/411, 413

(56) References Cited

U.S. PATENT DOCUMENTS

| 181,908 | A | 9/1876 | Chandler |
|---|---|---|---|
| 347,738 | A | 8/1886 | Pyle |
| 714,664 | A | 12/1902 | Briggs |
| 715,533 | A | 12/1902 | Anderson |
| 1,533,506 | A | 4/1925 | Mann |
| 1,572,733 | A | 2/1926 | McCourt |
| D125,661 | S | 3/1941 | Johnston |
| 2,280,666 | A | 4/1942 | Schofield |
| D164,145 | S | 7/1951 | Wright |
| 2,975,426 | A | 3/1961 | Rabb |
| D199,503 | S | 11/1964 | Davis |
| 3,361,514 | A | 1/1968 | Davis |
| 3,419,909 | A | 1/1969 | Spain |
| 3,944,344 | A | 3/1976 | Wichers |
| 4,006,974 | A | 2/1977 | Resnick |
| D259,295 | S | 5/1981 | Briggs |
| 4,837,862 | A | 6/1989 | Heil |
| 4,886,349 | A | 12/1989 | Willis |
| 5,129,106 | A | * 7/1992 | Liou ............................ 2/411 |
| 5,719,655 | A | 2/1998 | Peschel et al. |
| 5,949,514 | A | 9/1999 | Wargon |
| 6,135,592 | A | 10/2000 | Preutz |

FOREIGN PATENT DOCUMENTS

GB 2218824 A 11/1989

* cited by examiner

*Primary Examiner*—Hung Xuan Dang
(74) *Attorney, Agent, or Firm*—Price, Heneveld, Cooper, DeWitt & Litton

(57) ABSTRACT

Eyeglasses are provided that have an inflatable bladder in the temple piece. The temple pieces of the frame do not extend to the ears of the wearer.

15 Claims, 2 Drawing Sheets

EYEGLASS FRAME

BACKGROUND OF THE INVENTION

The present invention relates to eyewear that contains a frame, and more particularly to eyeglasses that do not have an earpiece.

Most of the contemporary eyewear uses an earpiece that rests on the ear of the wearer, or uses some kind of strap or curved piece that wraps around the head of the wearer to secure the eyewear to the wearer's head. However, eyewear with these features can be uncomfortable or impractical to wear, especially when wearing a helmet or a hat. Plus, in the case of an earpiece, it can cause aggravation to the wearer if that person lies down, or is under some other situation were the ears are at varied levels.

Attempts have been made to solve the problems associated with eyewear that employs earpieces or other securing means mentioned above, but have failed. Many of the ear piece-less eyeglasses use a spring-loaded piece that rests on the temple or side of the head. However, the spring-loaded pieces are not easily adjustable and therefore cause the glasses to either fall off the wearer's head or cause discomfort to the wearer. Therefore, there is a need for eyewear that is ear piece-less, adjustable, and comfortable for the wearer.

SUMMARY OF THE INVENTION

One aspect of the present invention is eyeglasses comprising a frame having a face piece, a first temple piece, and a second temple piece, where the first and second temple pieces are attached to the face piece. The eyeglasses also include at least one lens attached to the face piece and an inflatable bladder attached to the first and second temple pieces, where the inflatable bladder is adapted to assist in securing the eyeglasses on the head of a person.

Another aspect of the present invention is eyeglasses comprising a frame having a face piece, a first temple piece, and a second temple piece, where the first and second temple pieces are attached to the face piece. The eyeglasses also comprise at least one lens attached to the face piece and an inflatable bladder attached to the first and second temple pieces and having a pump, where the inflatable bladder is adapted to assist in securing the eyeglasses to the head of a person. The pump includes two finger pieces and the pump is adapted to fill the bladder with air when the finger pieces are moved. The eyeglasses also have a release valve attached to the bladder that causes air to be released from the bladder when activated.

Yet another aspect of the present invention is a method of securing eyeglasses on the head of a person, which has the following steps: (a) providing eyeglasses comprising a frame having,la face piece, a first temple piece, and second temple piece, the first and second temple pieces attached to the face piece, at least one lens attached to the face piece, a first inflatable bladder attached to the first temple piece; and two finger pieces attached to the bladder that work together as a pump to move air into the bladder; (b) placing the eyeglasses on the head of a person; and (c) pumping air into the bladder by squeezing the finger pieces toward one another until the eyeglasses are secured on the head of the person.

These and other features, advantages and objects of the present invention will be further understood and appreciated by those skilled in the art by reference to the following specification, claims and appended drawings.

DETAILED DESCRIPTION OF PREFERRED EMBODIMENT

For purposes of this invention, the term "eyeglasses" shall mean any type of eyewear having a frame and at least one lens, including, but not limited to spectacles, sunglasses, safety glasses, and underwater eyewear.

Figure 1:
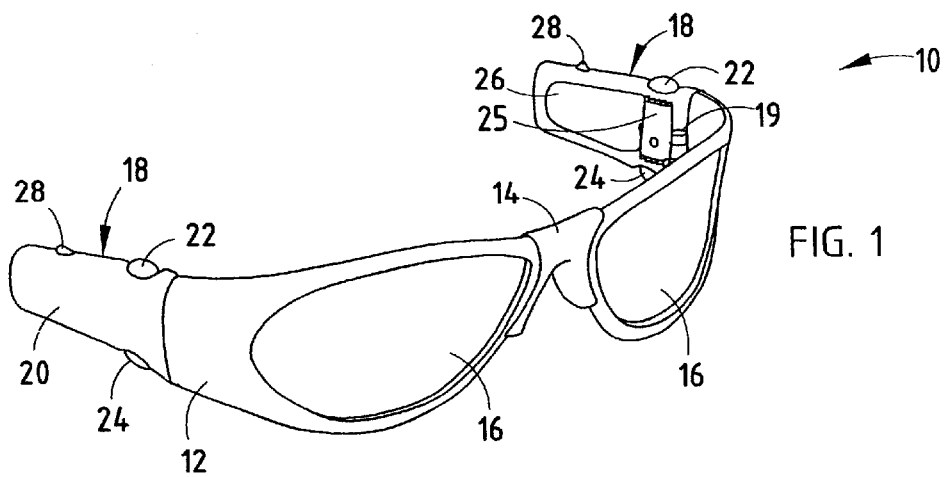
FIG. 1 is a perspective view of the eyeglasses of the present invention.

As shown in FIG. 1, the eyeglasses 10 of the present invention generally include a frame with a face piece 12, a nosepiece 14, at least one lens 16, and temple pieces 18. Temple pieces 18 are preferably attached to face piece 12 by a hinge 19 so that the temple pieces can be folded inwardly when storing the eyeglasses. The pieces of the frame are preferably made of a molded thermoplastic substance, but can be formed from many other rigid or semi-rigid materials. Nosepiece 14 includes a malleable connector (not shown) that can be manually bent to achieve very light pressure between the temple pieces 18 and the temples of the wearer.

Figure 2:
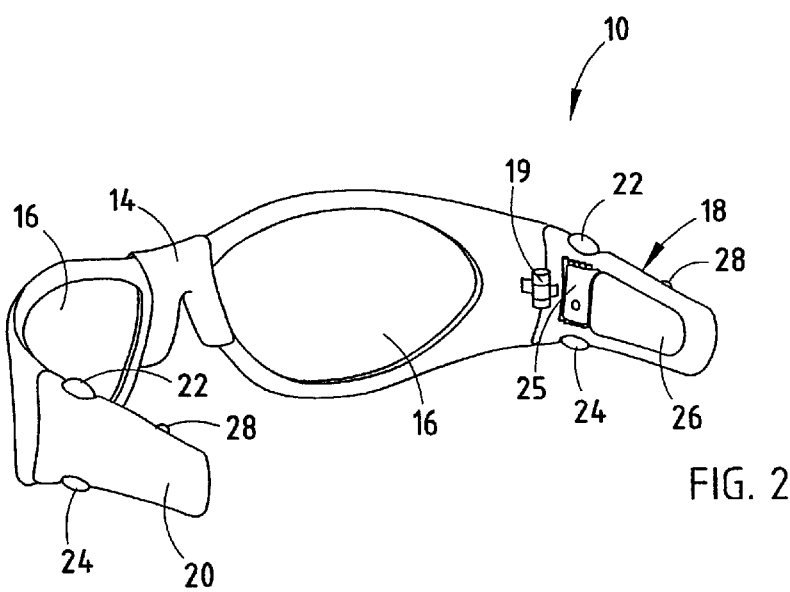
FIG. 2 is a rear perspective view of the eyeglasses of the present invention.
Figure 3:
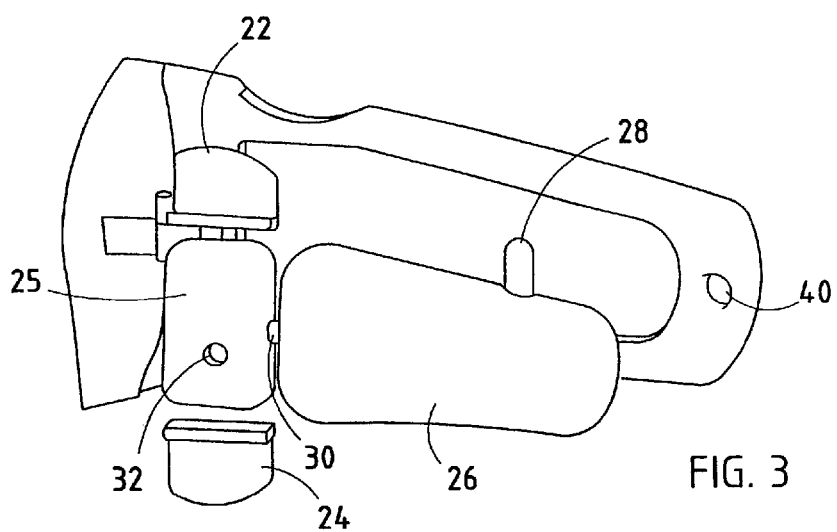
FIG. 3 is an elevational view of the temple piece of the eyeglasses of FIGS. 1 and 2, and the pump and bladder pieces that fit therein.

Temple pieces 18 are generally elongated and include a housing 20 (see FIGS. 1 and 2) that houses an air bladder 26 which has connected to it a pump 25. Pump 25 includes a first finger piece 22 and a second finger piece 24 and a one-way air inlet 32. Finger pieces 22, 24 are preferably located above and below the main body of pump 25, respectively. This allows easy pumpability as the finger pieces can be "squeezed" toward each other to pump air into bladder 26. One-way air inlet 32 allows air to enter when the pump is activated, but prevents air from escaping through it. Pump 25 is connected to bladder 26 by a one way valve 30 that will allow air or a different gas or fluid to enter the bladder but not exit through it.

Figure 4:
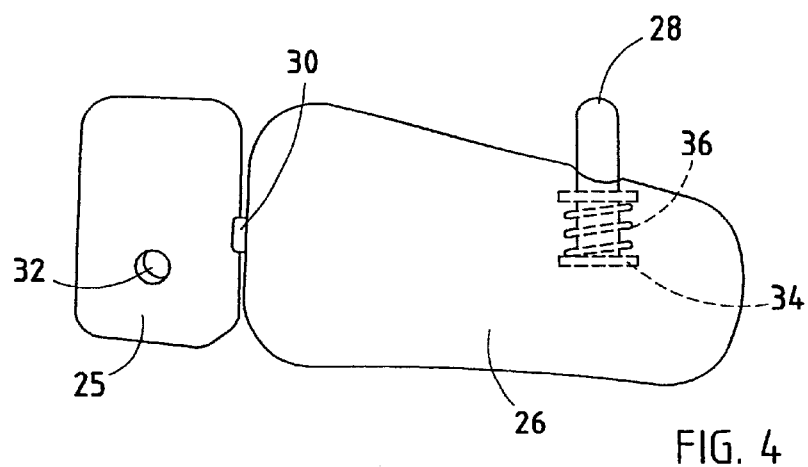
FIG. 4 is an elevational view of the bladder and release valve of the eyeglasses of FIGS. 1 and 2.

Bladder 26 also includes a release valve for releasing air out of the bladder. The release valve includes a button 28, a support 34 that is attached to the inside of bladder 26, and a spring 36 (see FIG. 4). The release valve is spring loaded so that it is naturally in the closed position with the button 28 being in a up position. If the button is depressed, the valve opens, allowing the release of air from the bladder until the button is released, causing the spring to force the button 28 upward, closing the valve. This ensures that once the bladder is filled with the desired volume of air, it will remain that volume until the air is intentionally released.

Housing 20 also preferably includes a hole 40 near the posterior end of the temple piece 18. Hole 40 can be used for attaching an optional headband or for hanging on a hook if desired. The housing is enclosed by a thin foam-like material with rear facing ridges to further prevent forward slipping of the eyeglasses.

Figure 5:
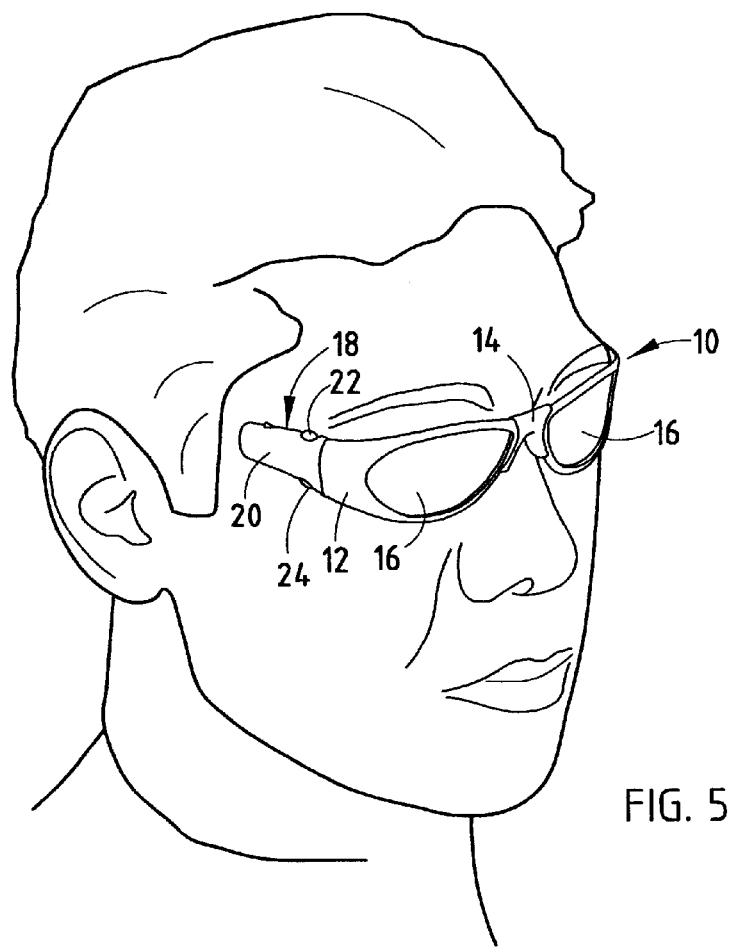
FIG. 5 is a perspective view of a person wearing the eyeglasses of the present invention.

In operation, under "normal wear" the wearer puts the eyeglasses 10 on his head resting the nosepiece 14 on his nose (see FIG. 5). The wearer would first adjust the eyeglasses, if needed, by bending them at the malleable connector to create light pressure of the temple pieces against the temple. The wearer then squeezes finger pieces 22 and 24 toward one another (one upward and one downward), on one or both temple pieces 18. The wearer squeezes the finger pieces repeatedly causing bladder 26 to fill with air and continues this process until eyeglasses 10 are comfortably secured on the head of the wearer. If the bladder is inflated too much, or the bladder needs to be deflated for any other reason, button 28 is depressed by pushing it downward, opening the release valve which allows the release of all or some of the air in bladder 26.

The eyeglasses of the present invention provide a comfortable, durable, and provide an easy way to secure the eyeglasses to a wearer's head and face without using earpieces. The eyeglasses are versatile and can be adjusted to fit a wide range of sizes, and can be made using a variety of different styles.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. Eyeglasses comprising:
   a frame comprised of a face piece, a first temple piece, and a second temple piece, the first and second temple pieces attached to the face piece; and
   at least one lens attached to the face piece;
   the first temple piece comprising a first inflatable bladder, and the first inflatable bladder adapted to assist in securing the eyeglasses on the head of a person.

2. The eyeglasses defined in claim 1 and further including a second inflatable bladder attached to the second temple piece.

3. The eyeglasses defined in claim 2 and further including a pump attached to at least one of the first and second inflatable bladders, the pump adapted to convey a gas or fluid into at least one of the first and second bladders when activated.

4. The eyeglasses defined in claim 3 wherein the first and second temple pieces are sized to not extend to the ear of a person during normal wear.

5. The eyeglasses defined in claim 4 and further including a release valve adapted to allow the release of gas or fluid from at least one of the first and second bladders.

6. The eyeglasses defined in claim 1 and further including a pump attached to the first inflatable bladder, the pump adapted to fill the first inflatable bladder with air when activated.

7. The eyeglasses defined in claim 1 wherein the first and second temple pieces are sized to not extend to the ear of a user during normal wear.

8. The eyeglasses defined in claim 1 and further including a release valve adapted to allow the release of gas or fluid from the first inflatable bladder.

9. Eyeglasses comprising:
   a frame comprised of a face piece, a first temple piece, and a second temple piece, the first and second temple pieces attached to the face piece;
   at least one lens attached to the face piece;
   a first inflatable bladder attached to the first temple piece and having a first pump, the first inflatable bladder adapted to assist in securing the eyeglasses to the head of a person, the first pump including two finger pieces, the pump adapted to fill the bladder with air when the finger pieces are moved; and
   a release valve attached to the bladder that causes air to be released from the bladder when activated.

10. The eyeglasses defined in claim 9 and further including a second inflatable bladder attached to the second temple piece.

11. The eyeglasses defined in claim 10 wherein the first and second temple pieces are sized to not extend to the ear of a person during normal wear.

12. The eyeglasses defined in claim 11 and further including a second pump, wherein the first pump is attached to the first temple piece and the second pump is attached to the second temple piece.

13. The eyeglasses defined in claim 9 wherein the first and second temple pieces are sized to not extend to the ear of a person during normal wear.

14. The eyeglasses defined in claim 9 and further including a second pump, wherein the first pump is attached to the first temple piece, and the second pump is attached to the second temple piece.

15. A method of securing eyeglasses on the head of a person, the method comprising the following steps:
   (a) providing eyeglasses comprising:
      a frame comprised of a face piece, a first temple piece, and a second temple piece, the first and second temple pieces attached to the face piece,
      at least one lens attached to the face piece,
      a first inflatable bladder attached to the first temple piece, and
      two finger pieces attached to the bladder that together work as a pump to move air into the bladder;
   (b) placing the eyeglasses on the head of a person; and
   (c) pumping air into the bladder by squeezing the finger pieces toward one another until the eyeglasses are secured on the head of the person.

* * * * *